US010262287B2

(12) United States Patent
Aneja et al.

(10) Patent No.: US 10,262,287 B2
(45) Date of Patent: *Apr. 16, 2019

(54) DATA COMPARISON AND ANALYSIS BASED ON DATA ANALYSIS REPORTING

(71) Applicant: International Business Machines Corporation, Armonk, NY (US)

(72) Inventors: Priyam Aneja, New Delhi (IN); Laxmi V. Bhatt, Pune (IN); Sonal Bhatt, Chhindwara (IN); Meghali V. Munoli, Pune (IN); Sonia L. Sequeira, Pune (IN); Hemant K. Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,906

(22) Filed: Mar. 25, 2016

(65) Prior Publication Data
US 2016/0260042 A1    Sep. 8, 2016

Related U.S. Application Data

(63) Continuation of application No. 14/640,670, filed on Mar. 6, 2015.

(51) Int. Cl.
*G06Q 10/06* (2012.01)

(52) U.S. Cl.
CPC .............. *G06Q 10/06393* (2013.01)

(58) Field of Classification Search
CPC ........ G06F 17/30554; G06F 17/30867; G06Q 10/06393
See application file for complete search history.

(56) References Cited

U.S. PATENT DOCUMENTS 7,603,653 B2 * 10/2009 Sundararajan ......... G06Q 10/06
715/730
7,707,490 B2    4/2010 Hays et al.
(Continued)

OTHER PUBLICATIONS

IBM, "List of IBM Patents or Patent Applications Treated as Related (Appendix P)," Mar. 25, 2016, p. 1-2.
(Continued)

*Primary Examiner* — Kris E Mackes
*Assistant Examiner* — Lin Lin M Htay
(74) *Attorney, Agent, or Firm* — Erik K. Johnson

(57) ABSTRACT

A method for comparing and analyzing data based on data analysis reports is provided. The method may include receiving a first dataset. The method may also include identifying a first portion of the first dataset and a second portion of the first dataset. Additionally, the method may include comparing and analyzing the first portion of the first dataset with the second portion of the first dataset. The method may also include receiving a second dataset from a location different from the first dataset. The method may further include comparing and analyzing the first portion and second portion of the first dataset with the second dataset. The method may also include receiving a plurality of first analysis results and a plurality of second analysis results based on the comparisons and the analyzes. The method may also include presenting the plurality of first analysis results and the plurality of second analysis results.

5 Claims, 9 Drawing Sheets

(56) References Cited

U.S. PATENT DOCUMENTS

| | | | |
|---|---|---|---|
| 7,881,958 B2 | 2/2011 | Buck et al. | |
| 7,912,701 B1* | 3/2011 | Gray | G06F 17/27 |
| | | | 704/257 |
| 2004/0093262 A1* | 5/2004 | Weston | G06Q 10/06 |
| | | | 705/7.34 |
| 2005/0027572 A1* | 2/2005 | Goshert | G06Q 40/08 |
| | | | 705/4 |
| 2008/0312986 A1* | 12/2008 | Braun | G06Q 10/06 |
| | | | 705/7.22 |
| 2009/0018996 A1* | 1/2009 | Hunt | G06Q 30/02 |
| 2009/0063426 A1* | 3/2009 | Crouch | G06F 17/30616 |
| 2009/0307054 A1* | 12/2009 | D'Imporzano | G06Q 10/06393 |
| | | | 705/7.29 |
| 2011/0035744 A1 | 2/2011 | Bhatia | |
| 2011/0283231 A1* | 11/2011 | Richstein | G06F 3/0488 |
| | | | 715/810 |
| 2013/0103615 A1* | 4/2013 | Mun | G06Q 40/06 |
| | | | 705/36 R |
| 2013/0144605 A1* | 6/2013 | Brager | G06F 17/28 |
| | | | 704/9 |
| 2013/0191418 A1 | 7/2013 | Martin, Jr. et al. | |
| 2014/0101010 A1 | 4/2014 | de Matos | |
| 2014/0172515 A1* | 6/2014 | Schmidt | G06Q 10/06393 |
| | | | 705/7.39 |
| 2014/0324521 A1* | 10/2014 | Mun | G06Q 10/06393 |
| | | | 705/7.28 |

OTHER PUBLICATIONS

Aneja et al., "Data Comparison and Analysis Based on Data Analysis Reporting," Application and Drawings, Filed on Mar. 6, 2015, 36 Pages, U.S. Appl. No. 14/640,670.

Dimensional Insight, Inc., "Empowering a sales organization with role-based dashboards and self-service reporting," The Diver Solution 6.2—Lipman Brothers, Inc., 2009.

Hoffman, "Business Intelligence: Empower Your Users with Business Intelligence," TechNet Magazine, Nov. 2010, pp. 1-5, Microsoft, https://technet.microsoft.com/en-us/magazine/gg405051.aspx, dated Mar. 4, 2015.

Sap, "SAP CO-PA Accelerator," SAP HANA Solutions—Financial Analysis Software, p. 1, http://www.sap.com/pc/tech/in-memory-computing-hana/software/profitability-analysis/index.html, accessed on Mar. 4, 2015.

* cited by examiner

DATA COMPARISON AND ANALYSIS BASED ON DATA ANALYSIS REPORTING

BACKGROUND

The present invention relates generally to the field of computing, and more specifically, to data analysis.

Business analysts typically create a data analysis report having information over a number of years. Furthermore, business analysts may use data analysis reports to evaluate business performance. For example, a business analyst may build a sales data analysis report to determine which products or services are growing or declining in sales over a number of years. Therefore, the data in the data analysis report may increase to a substantial size as each year passes. Thus, in order to determine the cause of growth or decline for a given product or service, business analysts themselves may have to perform detailed multi-level analysis of the data analysis report as well as retrieve and compare other data analysis reports for different years.

SUMMARY

A method for comparing and analyzing data based on data analysis reports is provided. The method may include receiving a first dataset. The method may also include identifying a first portion of the first dataset. The method may further include identifying a second portion of the first dataset. Additionally, the method may include comparing and analyzing the first portion of the first dataset with the second portion of the first dataset. The method may also include receiving a second dataset from a location different from the first dataset. The method may further include comparing and analyzing the first portion of the first dataset and the second portion of the first dataset with the second dataset. The method may also include receiving a plurality of first analysis results based on the comparison of the first portion of the first dataset with the second portion of the first dataset. The method may further include receiving a plurality of second analysis results based on the comparison of the first portion of the first dataset and the second portion of the first dataset with the second dataset. Furthermore, the method may include presenting the plurality of first analysis results and the plurality of second analysis results.

A computer system for comparing and analyzing data based on data analysis reports is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a first dataset. The method may also include identifying a first portion of the first dataset. The method may further include identifying a second portion of the first dataset. Additionally, the method may include comparing and analyzing the first portion of the first dataset with the second portion of the first dataset. The method may also include receiving a second dataset from a location different from the first dataset. The method may further include comparing and analyzing the first portion of the first dataset and the second portion of the first dataset with the second dataset. The method may also include receiving a plurality of first analysis results based on the comparison of the first portion of the first dataset with the second portion of the first dataset. The method may further include receiving a plurality of second analysis results based on the comparison of the first portion of the first dataset and the second portion of the first dataset with the second dataset. Furthermore, the method may include presenting the plurality of first analysis results and the plurality of second analysis results.

A computer program product for extraction and enrichment of a procedure from a document is provided. The computer program product may include one or more computer-readable storage devices and program instructions stored on at least one of the one or more tangible storage devices, the program instructions executable by a processor. The computer program product may include program instructions to receive a first dataset. The computer program product may also include program instructions to identify a first portion of the first dataset. The computer program product may further include program instructions to identify a second portion of the first dataset. Additionally, the computer program product may include program instructions to compare and analyze the first portion of the first dataset with the second portion of the first dataset. The computer program product may also include program instructions to receive a second dataset from a location different from the first dataset. The computer program product may further include program instructions to compare and analyze the first portion of the first dataset and the second portion of the first dataset with the second dataset. The computer program product may also include program instructions to receive a plurality of first analysis results based on the comparison of the first portion of the first dataset with the second portion of the first dataset. The computer program product may further include program instructions to receive a plurality of second analysis results based on the comparison of the first portion of the first dataset and the second portion of the first dataset with the second dataset. Furthermore, the computer program product may include program instructions to present the plurality of first analysis results and the plurality of second analysis results.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
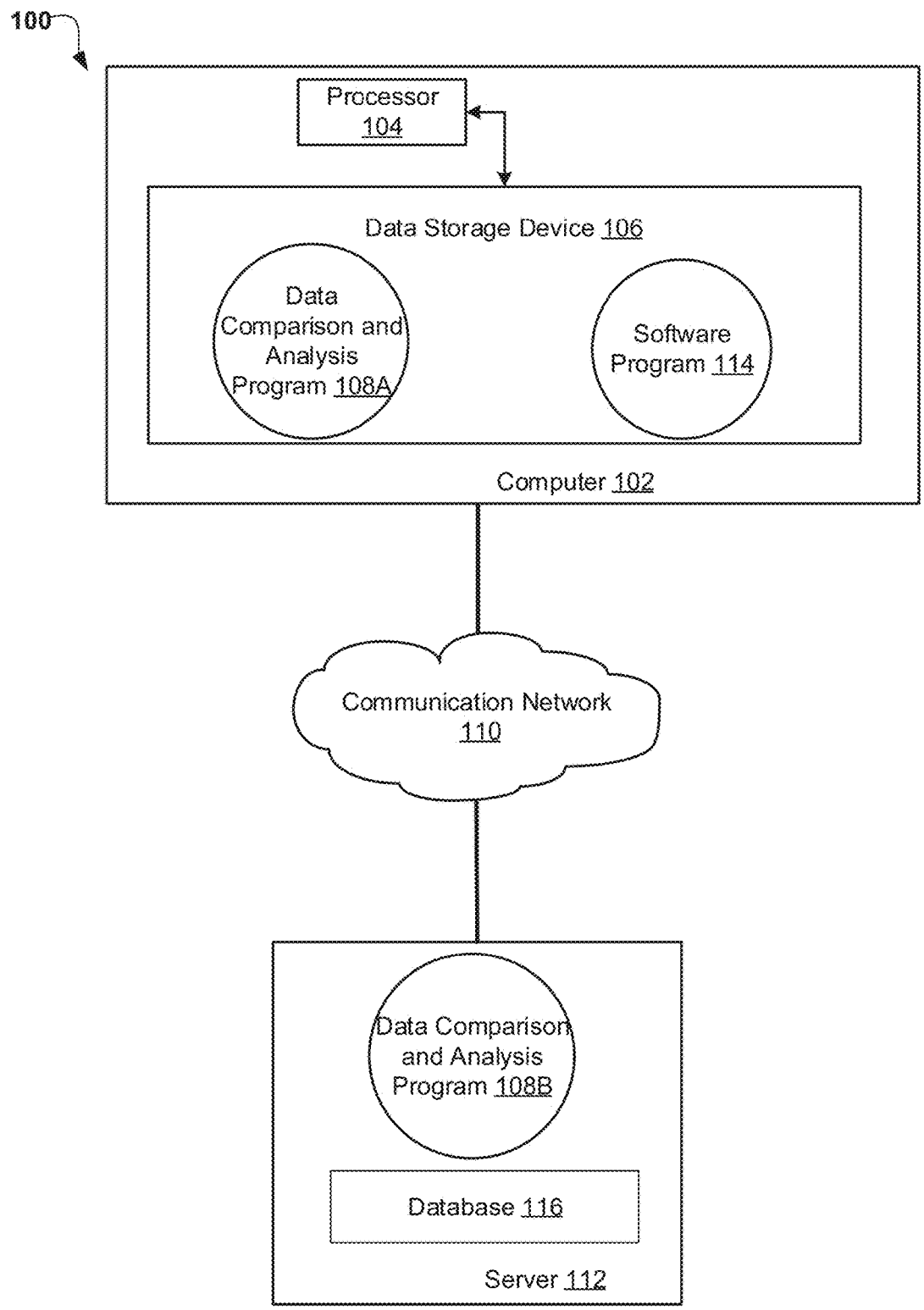
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to data analysis. The following described exemplary embodiments provide a system, method and program product for comparing data based on data analysis reports, analyzing the data, and presenting the analysis results. Additionally, the present embodiment has the capacity to improve the technical field of data analyzing by presenting analysis results of compared data based on data analysis reports.

As previously described with respect to data analyzing, business analysts may use data analysis reports to determine the business performance of a particular product or service. For example, business analysts may create a data analysis report to determine the sales performance of a particular product over a given number of years. Thus, business analysts may gather sales data for the product over the given number of years to put into a data analysis report. Thereafter, to determine the sales performance of the product, the business analysts themselves may further have to perform detailed analysis of the data analysis report by comparing the sales data within the data analysis report, and/or by comparing the sales data of the data analysis report with sales data from other data analysis reports from previous years. Therefore, by engaging in such a lengthy and tedious process, the business analyst may take more time to determine the performance of the product. As such, it may be advantageous, among other things, to provide a system, method and program product for comparing data based on data analysis reports, analyzing the data, and presenting the analysis results.

According to at least one embodiment of the present invention, data within data analysis reports may be compared and analyzed, and may also be compared with data of other data analysis reports. In one embodiment, data analysis reports may be created by a user. Then, according to one implementation, data within the data analysis reports may be compared and analyzed. Furthermore, data within the data analysis reports may be compared with other data analysis reports stored at different locations. Additionally, data analysis requests may be sent to a query engine where an analysis may be performed on the data analysis reports based on the analysis request. Also, according to one implementation, analysis results of the compared data analysis reports may be presented to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for comparing and analyzing data based on data analysis reports and presenting the analysis results.

According to at least one implementation, data within data analysis reports may be compared and analyzed, and the data may also be compared with data of other data analysis reports. In one embodiment, data analysis reports having data for one or more years may be created by a user. For example, a user may create a data analysis report having sales data for particular products and services over one or more years and for one or more countries. Then, according to one implementation, data within the data analysis reports may be compared and analyzed. For example, sales data from one year and country may be compared with sales data from other years for that country. Furthermore, data within the data analysis reports may be compared with other data analysis reports stored at different locations. Additionally, one or more analysis requests may be received by a query engine to analyze the data analysis reports based on the analysis request. For example, a data analysis request may be received to determine which year sales for a particular product declined. As such, data within the data analysis report may be analyzed to determine the declining year for the product based on the analysis request. Also, according to one implementation, analyzed results of the compared data analysis reports may be presented to the user.

Referring now to FIG. 1, an exemplary networked computer environment 100 in accordance with one embodiment is depicted. The networked computer environment 100 may include a computer 102 with a processor 104 and a data storage device 106 that is enabled to run a data comparison and analysis program 108A and a software program 114. The software program 114 may be an application program such as an internet browser. The data comparison and analysis program 108A may communicate with the software program 114. The networked computer environment 100 may also include a server 112 that is enabled to run a data comparison and analysis program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 9, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a data comparison and analysis program 108A and 108B may run on the client computer 102 or on the server computer 112. The data comparison and analysis program 108A, 108B may interact with a database, such as database 116, to receive data analysis reports, compare and analyze data analysis reports, and present the analysis results to the user. Furthermore, the data comparison and analysis program 108A, 108B may run on an application program 114, such as Firefox® (Firefox and all Firefox—based trademarks and logos are trademarks or registered trademarks of Mozilla and/or its affiliates), that interacts with a database 116 to receive data analysis reports, compare and analyze data based on the data analysis reports, and present the analysis results. The data comparison and analysis program method is explained in further detail below with respect to FIGS. 2-7.

Figure 2:
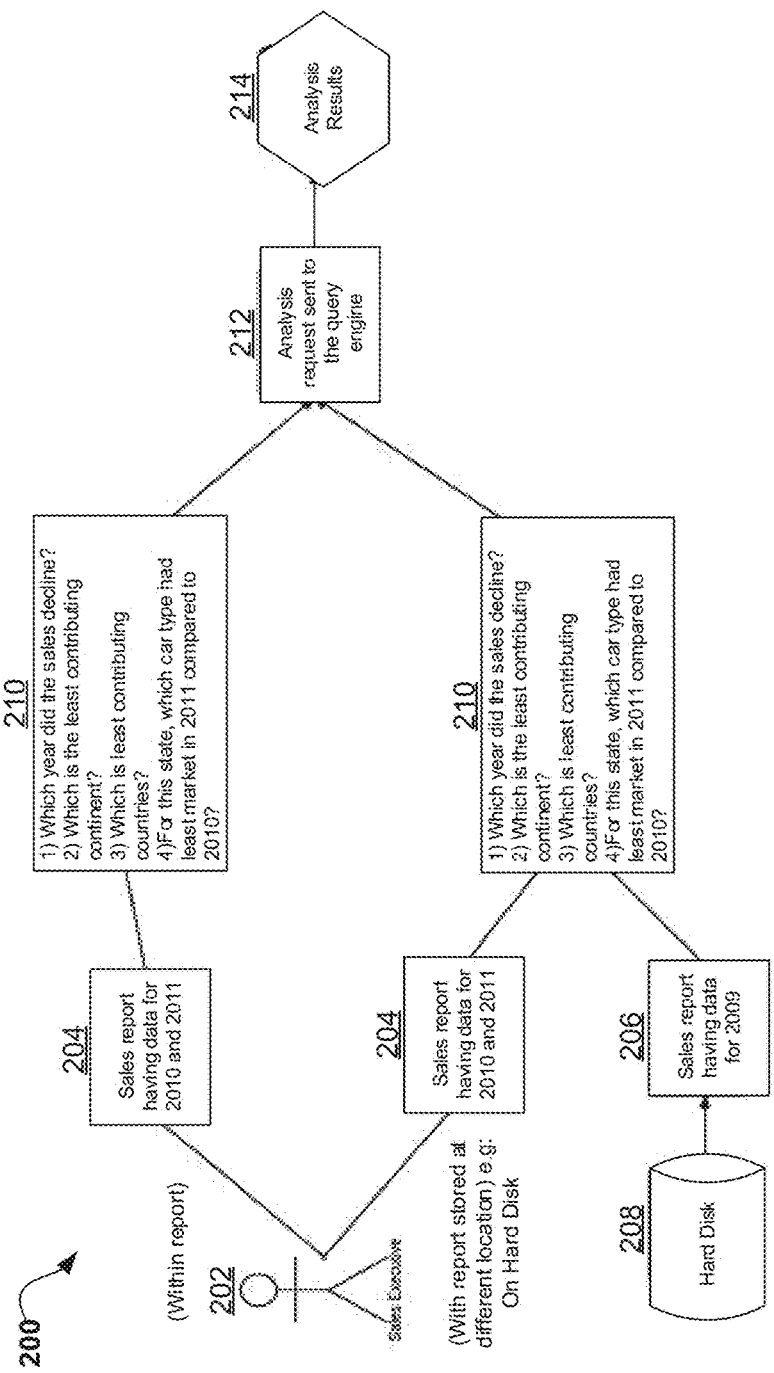
FIG. 2 illustrates a use case diagram according to one embodiment.

Referring now to FIG. 2, a use case diagram 200 in accordance with one embodiment is depicted. According to one implementation, the data comparison and analysis program 108A, 108B (FIG. 1) may compare and analyze data analysis reports created by a user 202. For example, a user may create and submit a sales report 204 having data for the years 2010 and 2011. Then, the data comparison and analysis program 108A, 108B (FIG. 1) may compare the data within the sales report 204. Furthermore, the data comparison and analysis program 108A, 108B (FIG. 1) may compare the data within the sales report 204 with a sales report 206 stored at a different location. For example, the data comparison and analysis program 108A, 108B (FIG. 1) may compare the sales report 204 having data for the years 2010 and 2011 to a sales report 206 stored at a different location on a hard disk 208 and having data for the year 2009.

Then, according to one implementation, the data comparison and analysis program 108A, 108B may analyze the data within the data analysis reports. For example, the data comparison and analysis program 108A, 108B (FIG. 1) may determine data analysis questions 210, such as: 1) which year did sales decline, 2) which is the least contributing continent, 3) which is least contributing countries, and 4) for this state, which car type had least market in 2011 compared to 2010. Then, the data comparison and analysis program 108A, 108B (FIG. 1) may send the data analysis questions 210 to a query engine 212. The query engine 212 may analyze the data analysis reports based on the data analysis questions 210. Next, the data comparison and analysis program 108A, 108B (FIG. 1) may present the analysis results 214.

Figure 3:
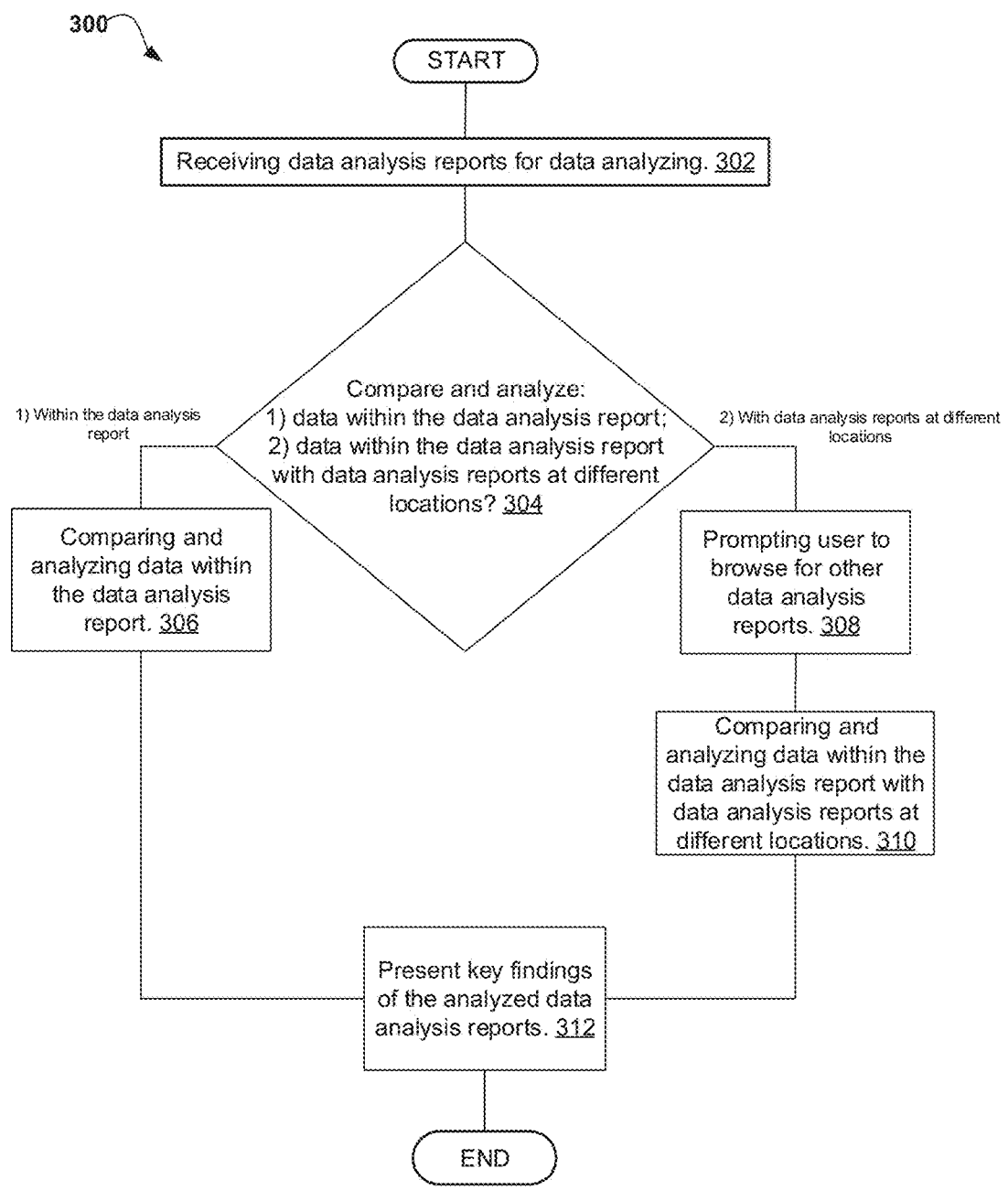
FIG. 3 is an operational flowchart illustrating the steps carried out by a program for comparing and analyzing data based on data analysis reports.

Referring now to FIG. 3, an operational flowchart 300 illustrating the steps carried out by a program for comparing and analyzing data analysis reports and presenting the analyzed results in accordance with one embodiment is depicted. As previously described, the data comparison and analysis program 108A, 108B (FIG. 1) may be implemented on a client computer 102 (FIG. 1) or server computer 112 (FIG. 1). According to at least one embodiment, the present embodiment may compare and analyze data based on data analysis reports and present the analysis results. The implementation for the steps in comparing and analyzing data analysis reports are described in more detail below.

At 302, the data comparison and analysis program 108A, 108B (FIG. 1) may receive data analysis reports for data analyzing. For example, client computer 102 (FIG. 1), which may be a mobile device, may be used by a user to access a software application program 114 (FIG. 1), such as a web browser (i.e. Firefox®), to receive a data analysis report created by the user. As will be discussed with reference to FIG. 6, the received data analysis reports may contain sales data for products and services. For example, one or more data analysis reports may contain sales data for a car based on two years, and the sales data may be further based on the type of car and countries where the car is sold. The data comparison and analysis program 108A, 108B (FIG. 1) may then interact with the software application program 114 (FIG. 1) to receive the data analysis report.

Next, at 304, the data comparison and analysis program 108A, 108B (FIG. 1) may compare and analyze data within the received data analysis reports, and may compare the received data analysis reports with data analysis reports stored at different locations. As such, according to one embodiment, and as will be discussed with reference to FIG. 6, the data comparison and analysis program 108A, 108B (FIG. 1) may compare car sales data 600 (FIG. 6) within the received data analysis report. Thus, with respect to the previous example, the car sales data 600 (FIG. 6) from one year may be compared and analyzed with the car sales data 600 (FIG. 6) from the same and other years within the received data analysis report. Alternatively, and as will be discussed with reference to FIG. 8, the data comparison and analysis program 108A, 108B (FIG. 1) may prompt and allow the user at 802 (FIG. 8) to choose comparing the data within the received data analysis report with data from data analysis reports stored at different locations. For example, the data comparison and analysis program 108A, 108B (FIG. 1) may compare and analyze the car sales data 600 (FIG. 6) within the received data analysis report with car sales data from data analysis reports stored on a hard disk at a different location.

At 306, based on input from the user, the data comparison and analysis program 108A, 108B (FIG. 1) may compare and analyze the data within the received data analysis reports. According to one implementation, and as will be discussed with further detail with respect to FIG. 5, a received data analysis report may have three key performance indicators (KPIs): product, year, and sales. Thus, the data comparison and analysis program 108A, 108B (FIG. 1) may compare the sales data of one product based on one year to sales data of the same and other products from other years. For example, a received data analysis report may have car sales data 600 (FIG. 6) for the years 2010 and 2011, as depicted in FIG. 6. Furthermore, the car sales data 600 (FIG. 6) may be based on the type of car and the continent in which each type of car was sold. Therefore, the data comparison and analysis program 108A, 108B (FIG. 1) may compare and analyze the car sales data 600 (FIG. 6) of one type of car from 2010 and sold in South America, to car sales data 600 (FIG. 6) of the same and other types of cars from 2011 and sold in other continents, such as Asia. The data comparison and analysis program 108A, 108B (FIG. 1) may further compare the car sales data 600 (FIG. 6) of each type of car based on the country, state, and city where the cars are sold. Thus, according to at least one embodiment of the present invention, data within the received data analysis reports may be compared and analyzed.

At 308, based on input from the user, the data comparison and analysis program 108A, 108B (FIG. 1) may prompt the user to browse for other data analysis reports. As previously described at step 304, the data comparison and analysis program 108A, 108B (FIG. 1) may compare the received data analysis reports with data analysis reports at different locations. As such, and as will be discussed with reference to FIG. 8, the data comparison and analysis program 108A, 108B (FIG. 1) may prompt the user at 802 (FIG. 8) to browse the location where other data analysis reports may be stored. For example, the received data analysis report may have car sales data 804 (FIG. 8) for the years 2010 and 2011, however, the user may want to compare the received data analysis report to car sales data from 2009. Thus, the data comparison and analysis program 108A, 108B (FIG. 1) may prompt the user at 802 (FIG. 8) to browse a hard disk to locate the data analysis report having car sales data from 2009.

Then, at 310, the data comparison and analysis program 108A, 108B (FIG. 1) may compare and analyze the received data analysis reports with data analysis reports stored at different locations. As previously described at 308, the user may want to compare the received data analysis report having car sales data 600 (FIG. 6) for 2010 and 2011 to the data analysis report stored at a different location having car sales data for 2009. As such, the data comparison and analysis program 108A, 108B (FIG. 1) may compare and analyze the car sales data 600 (FIG. 6) of different types of cars from 2009, 2010, and 2011. For example, the data comparison and analysis program 108A, 108B (FIG. 1) may compare and analyze the car sales data of one type of car from 2009 and sold in North America, to car sales data 600 (FIG. 6) of the same and other types of cars from 2010 and 2011 that were sold in other continents. Thus, car sales data from 2009 may be compared with car sales data 600 from the received data analysis report.

Figure 7:
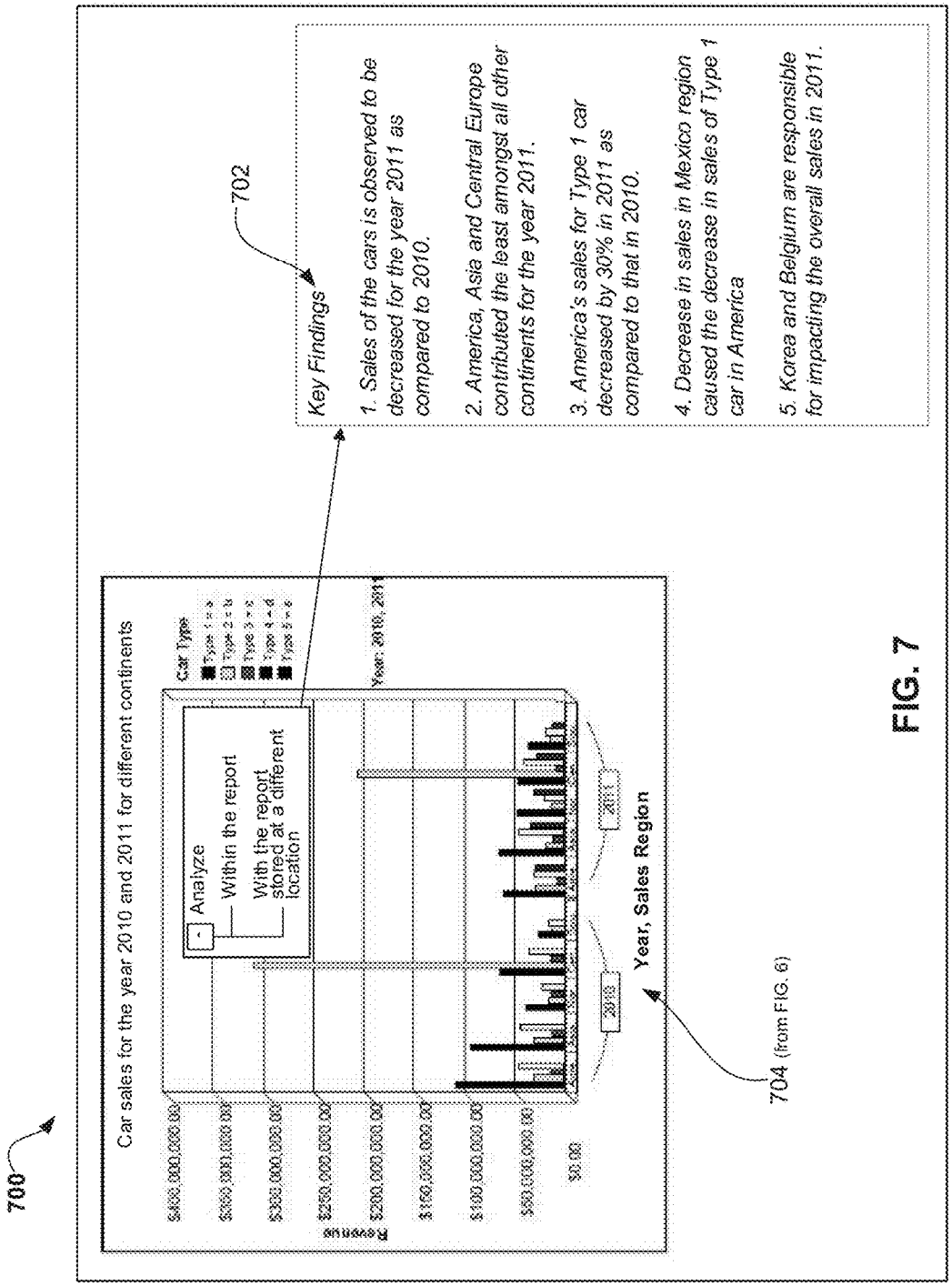
FIG. 7 illustrates an example of a program comparing and analyzing data within a data analysis report according to one embodiment.

Next, at 312, the data comparison and analysis program 108A, 108B (FIG. 1) may present key findings 702 (FIG. 7) of the analyzed data analysis reports. As previously described, the data comparison and analysis program 108A, 108B (FIG. 1) may compare and analyze data within the received data analysis reports, and also compare the received data analysis reports with data analysis reports stored at different locations. Based on the comparison and analysis, the data comparison and analysis program 108A, 108B (FIG. 1) may present key findings, or analysis results, of the data analysis reports. For example, and as will be discussed with reference to FIG. 7, the data comparison and analysis program 108A, 108B (FIG. 1) may compare and analyze data within the received data analysis report having car sales data 704 (FIG. 7) for the years 2010 and 2011 for different continents. Based on the comparison and analysis, the data comparison and analysis program 108A, 108B (FIG. 1) may present key findings 702 (FIG. 7).

Figure 4:
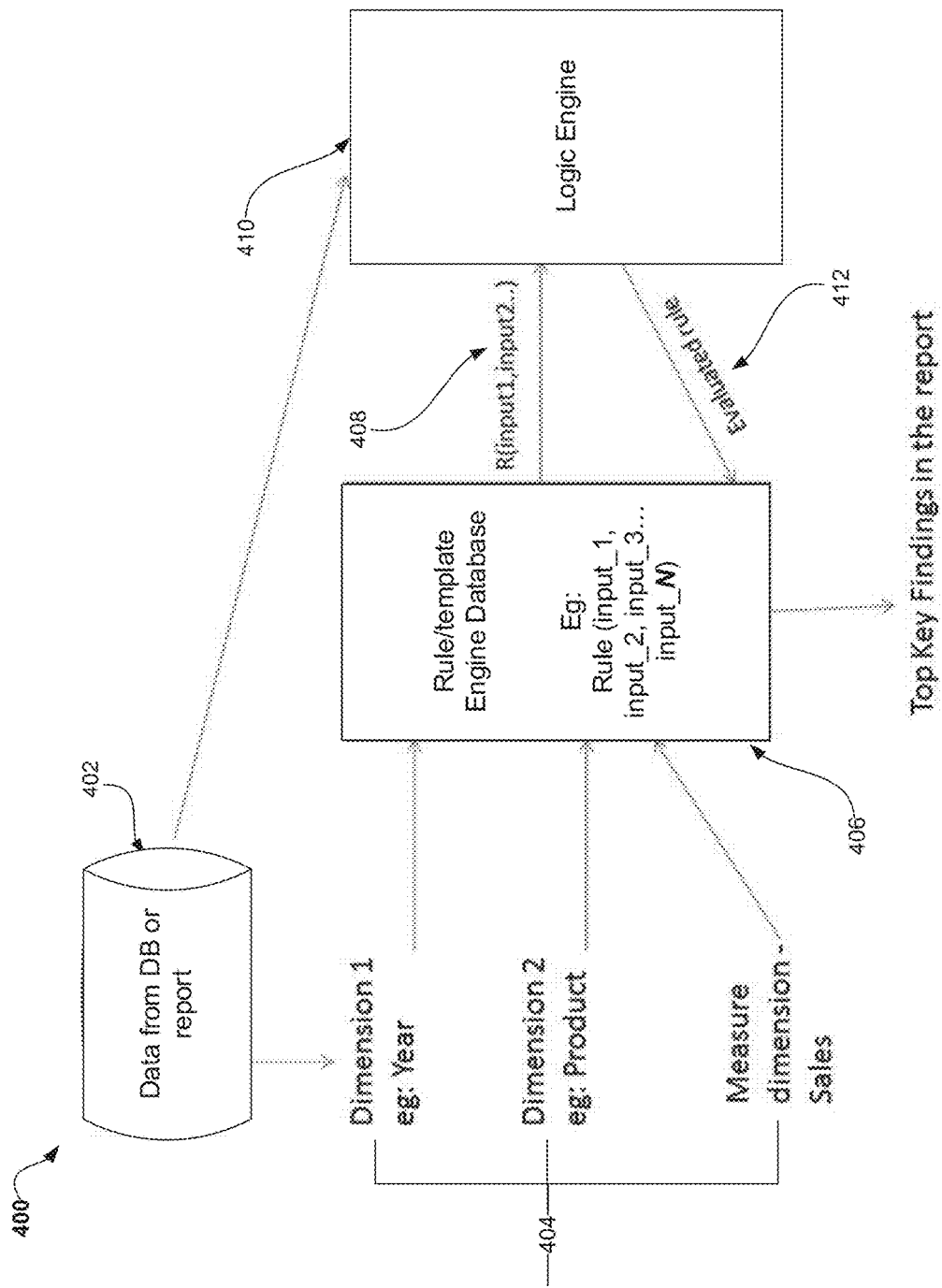
FIG. 4 is a block diagram of the system architecture of a program for comparing and analyzing data based on data analysis reports according to at least one embodiment.

Referring now to FIG. 4, a block diagram 400 illustrating the system architecture of a program for comparing and analyzing data based on data analysis reports in accordance with one embodiment is depicted. As previously described at step 306 (FIG. 3), the data comparison and analysis program 108A, 108B (FIG. 1) may compare and analyze data based on data analysis reports. As such, the data comparison and analysis program 108A, 108B (FIG. 1) may receive data from a data analysis report 402. Then, according to one implementation of the present embodiment, the data comparison and analysis program 108A, 108B (FIG. 1) may identify key performance indicators (KPIs) 404, based on the received data analysis report 402, to compare and analyze the data. The KPIs 404 may be dimensions in data analysis reports, such as year, product, and sales. Then, a rule/template engine database 406 may receive the identified KPIs 404, and may match KPI rules 408 to the identified KPIs 404. Next, a logic engine 410 may receive the data based on the received data analysis report 402, and may receive the KPI rules 408 corresponding to the identified KPIs 404. Thereafter, the logic engine 410 may compare and analyze the data from the data analysis report 402 based on the evaluation of the KPI rules 408. Then, the rule/template engine database may receive the evaluated KPI rules 412, and may match a template to the evaluated KPI rules 412 to present the key findings, such as the key findings 702 (FIG. 7) (described below).

Figure 5:
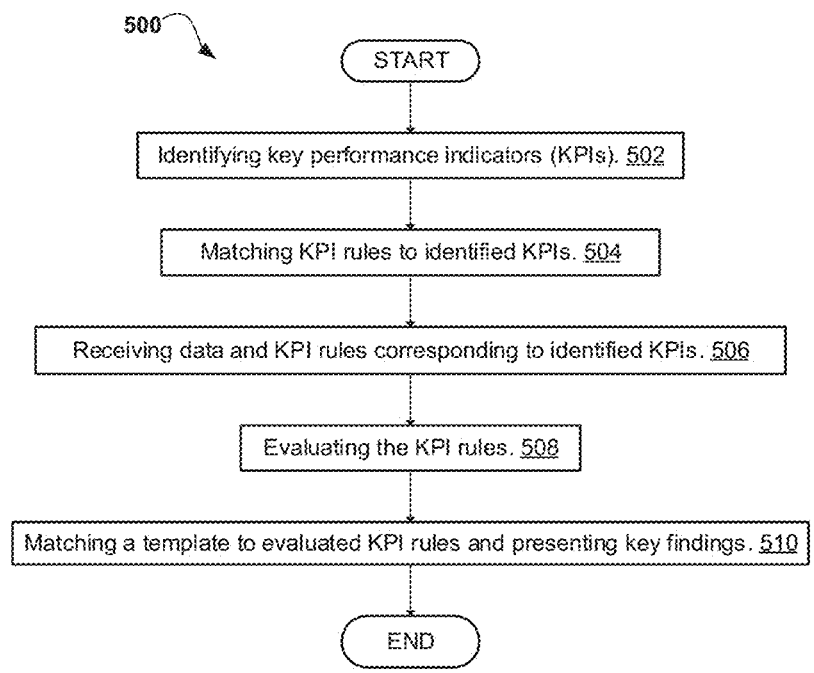
FIG. 5 is an operational flowchart illustrating the steps carried out by the system architecture of a program for comparing and analyzing data based on data analysis reports according to at least one embodiment.
Figure 6:
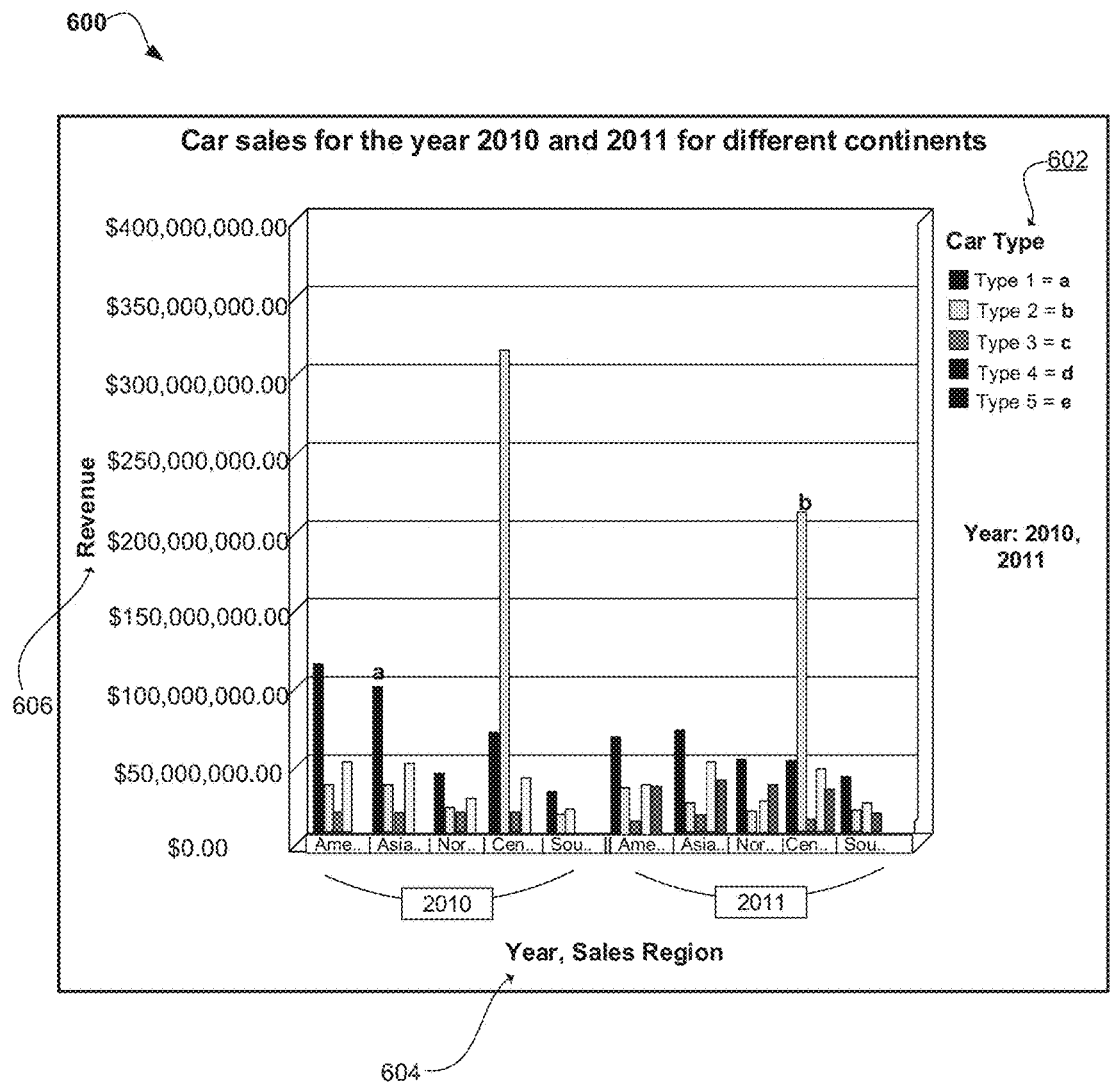
FIG. 6 illustrates an example of data within a data analysis report according to one embodiment.

Referring now to FIG. 5, an operational flowchart 500 further illustrating the steps carried out by the system architecture 400 (FIG. 4) of a data comparison and analysis program 108A, 108B (FIG. 1) for comparing and analyzing data based on data analysis reports in accordance with one embodiment is depicted. At 502, after receiving data from data analysis reports, the data comparison and analysis program 108A, 108B (FIG. 1) may identify key performance indicators (KPIs) 404 (FIG. 4) based on the received data analysis reports 402 (FIG. 4). For example, a received data analysis report 402 (FIG. 4) may have three dimensions: product, year, and sales. Thus, the data comparison and analysis program 108A, 108B (FIG. 1) may identify product, year, and sales as the KPIs 404 (FIG. 4) to be used in comparing and analyzing the data within the received data analysis reports 402 (FIG. 4) and with data analysis reports at different locations.

Then, at 504, the rule/template engine database 406 (FIG. 4) may receive the identified KPIs 404 (FIG. 4), and may match KPI rules 408 (FIG. 4) to the identified KPIs 404 (FIG. 4). The KPI rules 408 (FIG. 4) may be stored on the rule/template engine database 406 (FIG. 4), and may correspond to one or more combinations of KPIs 404 (FIG. 4). According to one implementation of the present embodiment, the KPI rules 408 (FIG. 4) may be in the form: Rule (input_1, input_2, . . . input_N). Furthermore, the KPI rules 408 (FIG. 4) may have KPI rule definitions (not shown), which may be used to compare and analyze data within the received data analysis reports 402 (FIG. 4) and with data analysis reports stored at different locations. According to one implementation, the KPI rule definition may be in the form: [input_1][input_2] for [input_N]<[input_1][input_2] for [input_N].

For example, the data comparison and analysis program 108A, 108B (FIG. 1) may identify product, year, and sales as KPIs 404 (FIG. 4). Then, the data comparison and analysis program 108A, 108B (FIG. 1) may scan the rule/template engine database 406 (FIG. 4) to find KPI rules 408 (FIG. 4) to match the identified KPIs 404 (FIG. 4). Thus, according to one implementation, one such KPI rule 408 (FIG. 4) may be: Rule 1 (Sales, Year, Product); where Rule 1 may be the rule name, and sales, year, and product may be the identified KPIs 404 (FIG. 4) present in the received data analysis report 402 (FIG. 4). Therefore, the KPI rule definition may be in the form: [Sales][Year] for [Product]< [Sales][Year] for [Product]. Furthermore, the data comparison and analysis program 108A, 108B (FIG. 1) may have one or more KPI rules 408 (FIG. 4) corresponding to one or more combinations of KPIs 404 (FIG. 4).

Next, at 506, the logic engine 410 (FIG. 4) may receive the data based on the received data analysis report 402 (FIG. 4), and may receive the KPI rules 408 (FIG. 4) corresponding to the identified KPIs 404 (FIG. 4). For example, based on the received data analysis report 402 (FIG. 4), the logic engine 410 (FIG. 4) may receive sales data for different types of cars for the years 2010 and 2011. Furthermore, the logic engine 410 (FIG. 4) may receive KPI rules 408 (FIG. 4), which correspond to the KPIs 404 (FIG. 4) based on the received data analysis report 402 (FIG. 4), and the KPI rules 408 (FIG. 4) may be in the form: Rule 1(Sales, Year, Product). As such, the KPI rule definition may be: [Sales] [Year] for [Product]<[Sales] [Year] for [Product].

Then, at 508, the logic engine 410 (FIG. 4) may evaluate the KPI rules 408 (FIG. 4). According to one implementation of the present embodiment, data from the data analysis report 402 (FIG. 4) may be inputted into each of the inputs specified in the KPI rules 408 (FIG. 4). For example, the years 2010 and 2011 may be inputted for the input "Year" in the KPI rules 408 (FIG. 4). Furthermore, based on the received data analysis report 402 (FIG. 4), each type of car may be inputted for the input "Product", and the sales value for each type of car may be inputted for the input "Sales". Therefore, one resultant KPI rule definition may be: [$125M][2010] for [Type4]<[$275M][2011] for [Type2]. As such, there may be more combinations of KPI rule definitions given the amount of data compared and analyzed and the amount of KPIs 404 (FIG. 4). For example, based on the received data analysis report 402 (FIG. 4), input "Country" may be an added KPI to the KPI rules. Thus, the logic engine 410 (FIG. 4) may evaluate the data from the data analysis report 402 (FIG. 4) based on the KPI rules 408 (FIG. 4).

Next, at 510 the rule/template engine database 406 (FIG. 4) may match a template to the evaluated KPI rules 412 (FIG. 4), and present the key findings. As previously described, the logic engine 410 (FIG. 4) may evaluate the KPI rules 408 (FIG. 4) based on the data received from the data analysis report 402 (FIG. 4). Thereafter, the rule/template engine database 406 (FIG. 4) may receive the evaluated KPI rules 412 (FIG. 4), and may match a template corresponding to the evaluated KPI rules 412 (FIG. 4) based on the data from the received data analysis report 402 (FIG. 4). For example, sales data for each type of car in the years 2010 and 2011 may be compared based on the KPI rules 408 (FIG. 4). As such, the rule/template engine database 406 (FIG. 4) may match a template to the evaluated KPI rules 412 (FIG. 4) and car sales data. According to one implementation of the present embodiment, the template may be filled with the compared results of the evaluated KPI rules 412 (FIG. 4) and car sales data. Thereafter, the rule/template engine database 406 (FIG. 4) may present the key findings.

Referring now to FIG. 6, an example 600 of data based on data analysis reports in accordance with one embodiment is depicted. As previously described in the example at step 302 (FIG. 3), data analysis reports may contain sales data for products and services. For example, one or more data analysis reports may contain sales data for a car based on two years, 2010 and 2011, and the sales data may be further based on the type of car and the continent, country, state, and city where the car is sold. Thus, according to one embodiment, the car sales data may include the car type 602, the sales region and year 604 of each car type 602, and the revenue 606 of each car type 602 based on the sales region and year 604. As such, with respect to FIG. 3, car type 1 may have $80,000,000 in car sales for Asia in 2010, and car type 2 may have $210,000,000 in car sales for Central America in 2011.

Referring now to FIG. 7, an example 700 of the data comparison and analysis program 108A, 108B (FIG. 1) presenting key findings 702 based on comparing and analyzing data within a data analysis report in accordance with one embodiment is depicted. As previously described at step 312 (FIG. 3), the data comparison and analysis program 108A, 108B (FIG. 1) may present key findings 702 of the analyzed data analysis reports. For example, the data comparison and analysis program 108A, 108B (FIG. 1) may compare and analyze data within the received data analysis report having car sales data 704 for the years 2010 and 2011 for different continents. Based on the comparison and analysis, the data comparison and analysis program 108A, 108B (FIG. 1) may present key findings 702 (FIG. 7), such as: 1) Sales of the cars is observed to be decreased for the year 2011 as compared to 2010; 2) America, Asia and Central Europe contributed the least amongst all other continents for the year 2011; 3) America's sales for Type 1 car decreased by 30% in 2011 as compared to that in 2010; 4) Decrease in sales in Mexico region caused the decrease in sales of Type 1 car in America; and 5) Korea and Belgium are responsible for impacting the overall sales in 2011.

Figure 8:
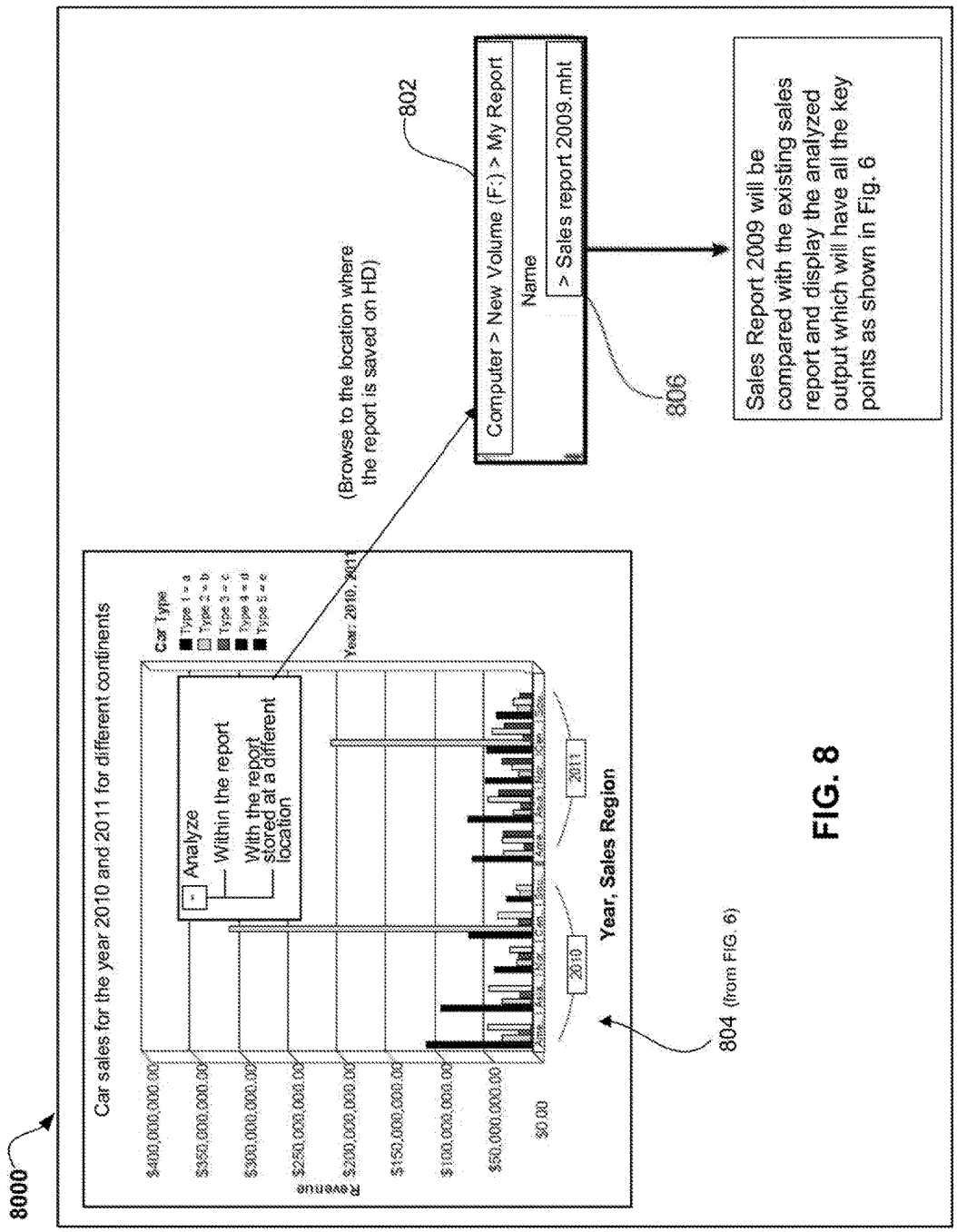
FIG. 8 illustrates an example of a program comparing and analyzing data within a data analysis report with data analysis reports stored at different locations according to one embodiment.

Referring now to FIG. 8, an example 8000 of the data comparison and analysis program 108A, 108B (FIG. 1) comparing and analyzing data within a data analysis report with a data analysis report stored at a different location according to one embodiment in accordance with one embodiment is depicted. As previously described at step 308 (FIG. 3), the data comparison and analysis program 108A, 108B (FIG. 1) may prompt the user at 802 to browse the location where other data analysis reports may be stored. For example, the received data analysis report may have car sales data 804 for the years 2010 and 2011, however, the user may want to compare the received data analysis report to car sales data from 2009. Thus, the data comparison and analysis program 108A, 108B (FIG. 1) may prompt the user at 802 to browse a hard disk to locate the data analysis report 806 having car sales data from 2009. Then, the data comparison and analysis program 108A, 108B (FIG. 1) may compare the data analysis report having car sales data from 2009 to the received data analysis report having car sales data 804 for the years 2010 and 2011.

Figure 9:
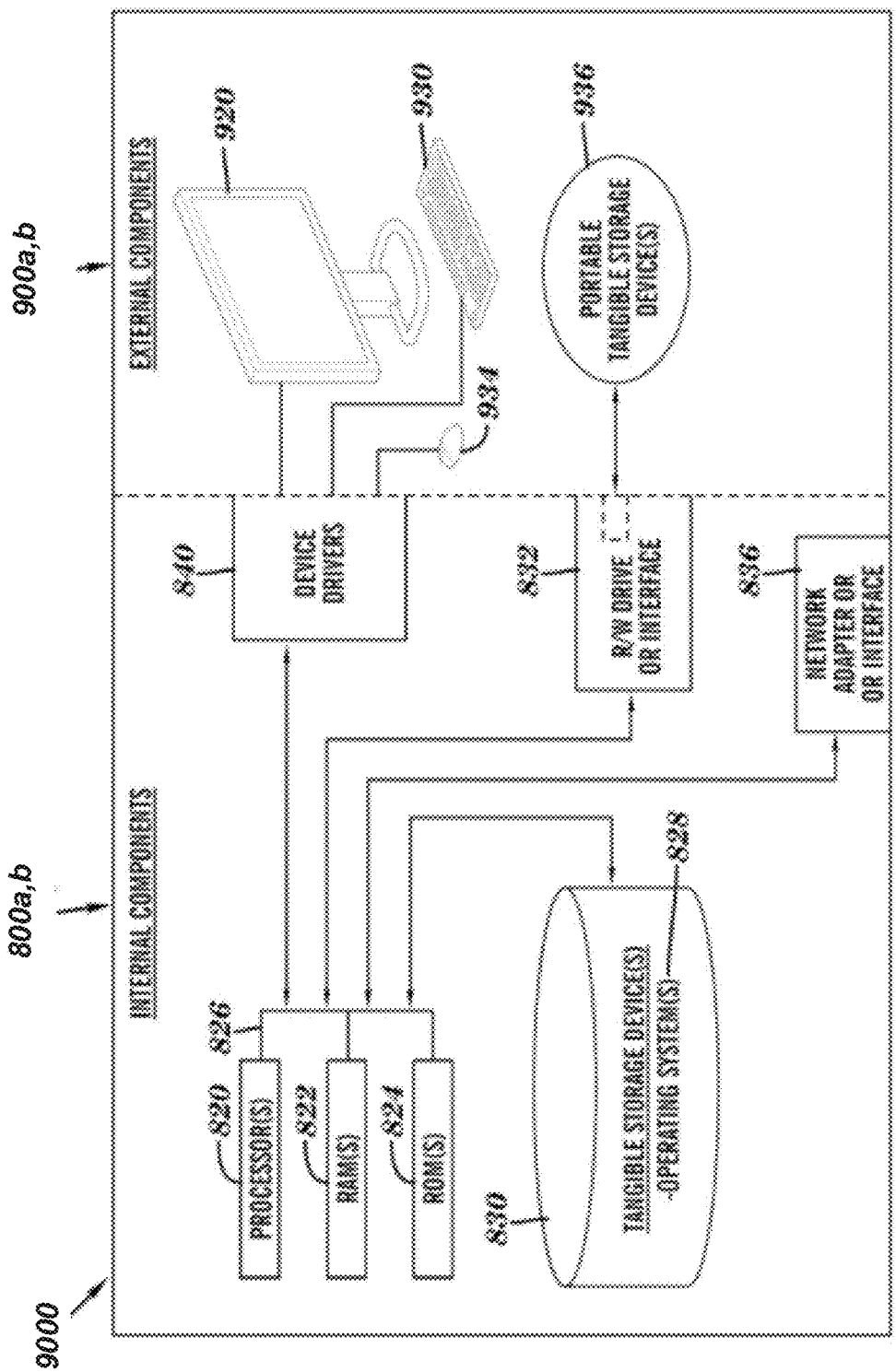
FIG. 9 is a block diagram of internal and external components of computers and servers depicted in FIG. 1 according to at least one embodiment.

FIG. 9 is a block diagram 9000 of internal and external components of computers depicted in FIG. 1 in accordance with one embodiment is depicted It should be appreciated that FIG. 9 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 9. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the data comparison and analysis program 108A (FIG. 1) in client computer 102 (FIG. 1), and the data comparison and analysis program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the data comparison and analysis program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The data comparison and analysis program 108A (FIG. 1) and software program 114 (FIG. 1) in client computer 102 (FIG. 1), and the data comparison and analysis program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the data comparison and analysis program 108A (FIG. 1) and software program 114 (FIG. 1) in client computer 102 (FIG. 1) and the data comparison and analysis program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for comparing, analyzing, and presenting data based on data analysis reports, the method comprising:
receiving a first report from a first source;
identifying a first portion of the first report;
identifying a second portion of the first report;
receiving a query from a user, wherein the query comprises one or more natural language processed questions based on data within the first report and based on a comparison of the first report to at least one of a second report;
in response to the one or more natural language processed questions being based on data within the first report, comparing and analyzing the first portion of the first report with the second portion of the first report by identifying key performance indicators in the first source, and matching a template comprising a set of rules to the identified plurality of key performance indicators in the first source;
in response to the one or more natural language processed questions being based on the comparison of the first report to at least one of the second report, receiving the second report from a second source, wherein the second source is stored at a computer location different from the first source;
comparing and analyzing the first portion of the first report and the second portion of the first report with the second report by identifying the key performance indicators in the second source, and matching the template comprising the set of rules to the identified plurality of key performance indicators in the first source and the second source;
in response to the one or more natural language processed questions being based on data within the first report, receiving a plurality of first analysis results based on the comparison of the first portion of the first report with the second portion of the first report by evaluating the set of rules associated with the template in the first source;
in response to the one or more natural language processed questions being based on the comparison of the first report to the second report, comparing and analyzing first data within the first report based on the first portion and the second portion to second data within the second report, and receiving a plurality of second analysis results derived from the comparison and analysis of the first data within the first report to the second data within the second report by evaluating the set of rules associated with the template in the first source and the second source; and
combining and presenting the plurality of first analysis results and the plurality of second analysis results, wherein the plurality of first analysis results and the plurality of second analysis results are presented as summarized textual sentences in response to the one or more natural language processed questions, and wherein the summarized textual sentences associated with the plurality of second analysis results comprises at least one textual sentence that summarizes the comparison of the first data within the first report to the second data within the second report.

2. The method of claim 1, wherein a plurality of reports are received, and one or more portions of the plurality of reports are compared and analyzed.

3. The method of claim 1, wherein the first portion of the first report and the second portion of the first report are different data within the first report.

4. The method of claim 1, wherein the receiving the second report from the computer location different from the first report is based on prompting and detecting a user action to locate the second dataset.

5. The method of claim 1, wherein the computer location comprises a database.

\* \* \* \* \*